US010695696B2

(12) United States Patent
Sorteberg

(10) Patent No.: US 10,695,696 B2
(45) Date of Patent: Jun. 30, 2020

(54) SYSTEM FOR PROCESSING SOLID AND LIQUID CONSTRUCTION WASTE

(71) Applicant: Clean Slurry Technology Inc., Bakersfield, CA (US)

(72) Inventor: Barry Lynn Sorteberg, Bakersfield, CA (US)

(73) Assignee: Clean Slurry Technology Inc., Bakersfield, CA (US)

(*) Notice: Subject to any disclaimer, the term of this patent is extended or adjusted under 35 U.S.C. 154(b) by 316 days.

(21) Appl. No.: 15/857,567

(22) Filed: Dec. 28, 2017

(65) Prior Publication Data

US 2018/0178146 A1  Jun. 28, 2018

Related U.S. Application Data

(60) Provisional application No. 62/439,605, filed on Dec. 28, 2016.

(51) Int. Cl.
*B01D 21/24* (2006.01)
*B01D 21/34* (2006.01)
*B01D 46/48* (2006.01)
*B04B 11/04* (2006.01)
*B03B 9/06* (2006.01)
(Continued)

(52) U.S. Cl.
CPC ..... *B01D 21/2477* (2013.01); *B01D 21/2433* (2013.01); *B01D 21/34* (2013.01); *B01D 46/48* (2013.01); *B03B 9/065* (2013.01); *B04B 1/20* (2013.01); *B04B 11/043* (2013.01); *B07B 1/00* (2013.01); *B01D 21/262* (2013.01); *B02C 19/0056* (2013.01); *B04B 2001/2075* (2013.01);
(Continued)

(58) Field of Classification Search
CPC ... B07B 1/00; B07B 2230/01; B01D 21/2433; B01D 21/2477; B01D 21/262; B01D 21/34; B04B 1/20; B04B 11/043; B04B 2001/2075; B02C 19/0056; C02F 1/38; Y02W 30/58
See application file for complete search history.

(56) References Cited

U.S. PATENT DOCUMENTS 5,570,749 A * 11/1996 Reed .................... E21B 21/066
175/206
5,699,969 A * 12/1997 Isaji ........................ B03B 5/02
241/24.12
(Continued)

*Primary Examiner* — Charles A Fox
*Assistant Examiner* — Kalyanavenkateshware Kumar

(57) ABSTRACT

A system for processing solid and liquid waste includes a first shale shaker, a second shale shaker, a submersible pump, a centrifugal pump, a first collection tank, a second collection tank, a mud cleaner assembly, a variable frequency drive (VFD) centrifugal solid-liquid separator, and a water clarifying assembly. The first shale shaker is in fluid communication with the second shale shaker through the submersible pump. The second shale shaker is in fluid communication with the centrifugal pump through the first collection tank. The centrifugal pump is in fluid communication with the mud cleaner assembly. The mud cleaner assembly is in fluid communication with the VFD centrifugal solid-liquid separator through the water clarifying assembly. Resultantly, the system discharges a flow of usable water through the VFD centrifugal solid-liquid separator as an initial load of solid and liquid waste is inputted into the first shale shaker.

17 Claims, 7 Drawing Sheets

(51) Int. Cl.
*B04B 1/20* (2006.01)
*B07B 1/00* (2006.01)
B02C 19/00 (2006.01)
C02F 1/38 (2006.01)
B01D 21/26 (2006.01)

(52) U.S. Cl.
CPC ............ *B07B 2230/01* (2013.01); *C02F 1/38* (2013.01); *Y02W 30/58* (2015.05)

(56) References Cited

U.S. PATENT DOCUMENTS

| | | | | |
|---|---|---|---|---|
| 5,824,210 A | * | 10/1998 | Kuryluk | B01D 21/283 |
| | | | | 209/3 |
| 5,843,315 A | * | 12/1998 | Baughn | B01D 21/01 |
| | | | | 210/723 |
| 6,162,284 A | * | 12/2000 | Mitchell | B01D 19/0005 |
| | | | | 95/261 |
| 2003/0006194 A1 | * | 1/2003 | Williams | C02F 1/385 |
| | | | | 210/702 |
| 2012/0267287 A1 | * | 10/2012 | Bailey | B07B 1/4609 |
| | | | | 209/10 |

\* cited by examiner

SYSTEM FOR PROCESSING SOLID AND LIQUID CONSTRUCTION WASTE

The current application claims a priority to the U.S. Provisional Patent application Ser. No. 62/439,605 filed on Dec. 28, 2016.

FIELD OF THE INVENTION

The present invention relates generally to process for handling solid waste. More specifically, the present invention is a process for handling solid-liquid waste collected from various construction sites by vacuum trucks and hydro excavators as well as other waste streams encountered in the construction trade.

BACKGROUND OF THE INVENTION

Most solid-liquid waste collected from a construction site is generally handled at the end of the drilling process and/or end of the completion of work as the solid-liquid waste is collected into storage pools to implements directly curing process. The specific method is to be the formation of natural sedimentation of the solid and sludge supernatant due to gravitational force and clear liquid. Then, additional hardener agents and water purification agents can be added to further cure the clear water. However, this method is inefficient due to the total amount of waste to be disposed of in high-water content, a lot of chemicals consumption, high cost, the effect is not ideal, and cannot completely eliminate pollution risks. Additionally, collected slurry can be harmful for surrounding soil, water sources, farmlands and air. Even though many have used different construction equipment such as shale shakers, desilters, and desanders to process solid-liquid waste, these also fail to efficiently function under large volume of solid-liquid waste.

It is therefore an objective of the present invention to provide a system for processing solid and liquid waste collected from various construction sites. More specifically, the present invention takes the solid-liquid waste and produces stable solids and water that is clean enough for reuse in many different scenarios. Water may be used back into the construction process, used for dust control, sent to sewer for reclamation or treated to be returned to surface water. The present invention is taking a very unusable product and turning it into a recyclable stream of materials. The water can be reclaimed and reused, and the solids can be reclassified into usable aggregate or material for underlayment of roads. Resultantly, the present invention keeps solid material out of our landfills and conserves precious resources thus implementing efficient and affordable system to processing solid and liquid waste.

DETAIL DESCRIPTIONS OF THE INVENTION

All illustrations of the drawings are for the purpose of describing selected versions of the present invention and are not intended to limit the scope of the present invention.

The present invention is a system for processing solid and liquid waste. More specifically, the present invention is able to process solid and liquid waste collected from various construction sites by vacuum trucks, hydro excavators, dump trucks, and covered bins in order to produce stable solids and water that is clean enough for reuse in many different scenarios such as back into the construction process, used for dust control, sent to sewer for reclamation or treated to be returned to surface water. In other words, the present invention takes a very unusable product and turns it into a recyclable stream of materials as the water can be reclaimed and reused and the solids can be reclassified into usable aggregate or material for underlayment of roads. Resultantly, the present invention keeps the solid and liquid waste out of landfills thus conserving natural resources and reducing environmental pollution.

Figure 1:
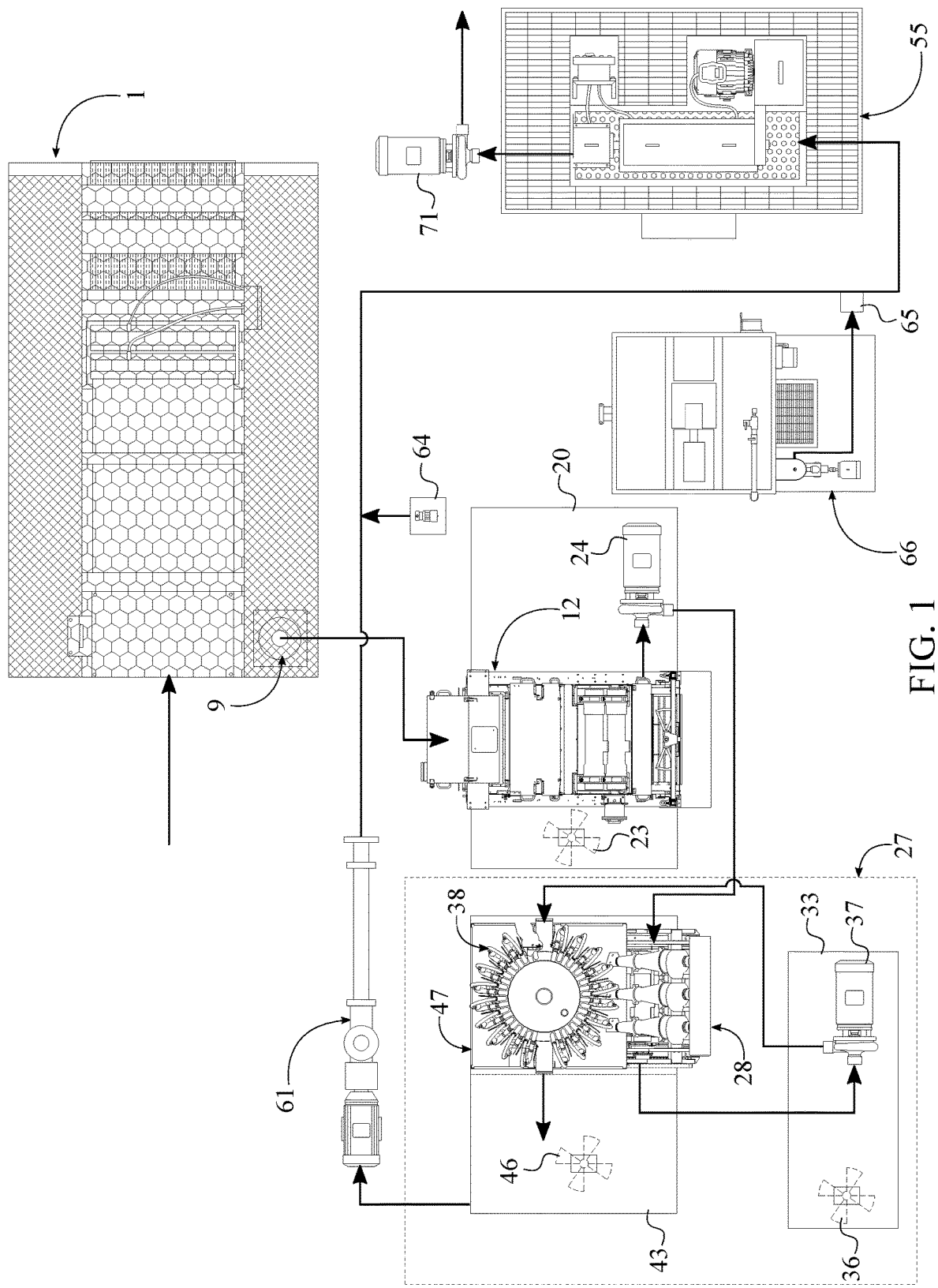
FIG. 1 is an illustration showing the overall in-fluid communication of the present invention.
Figure 2:
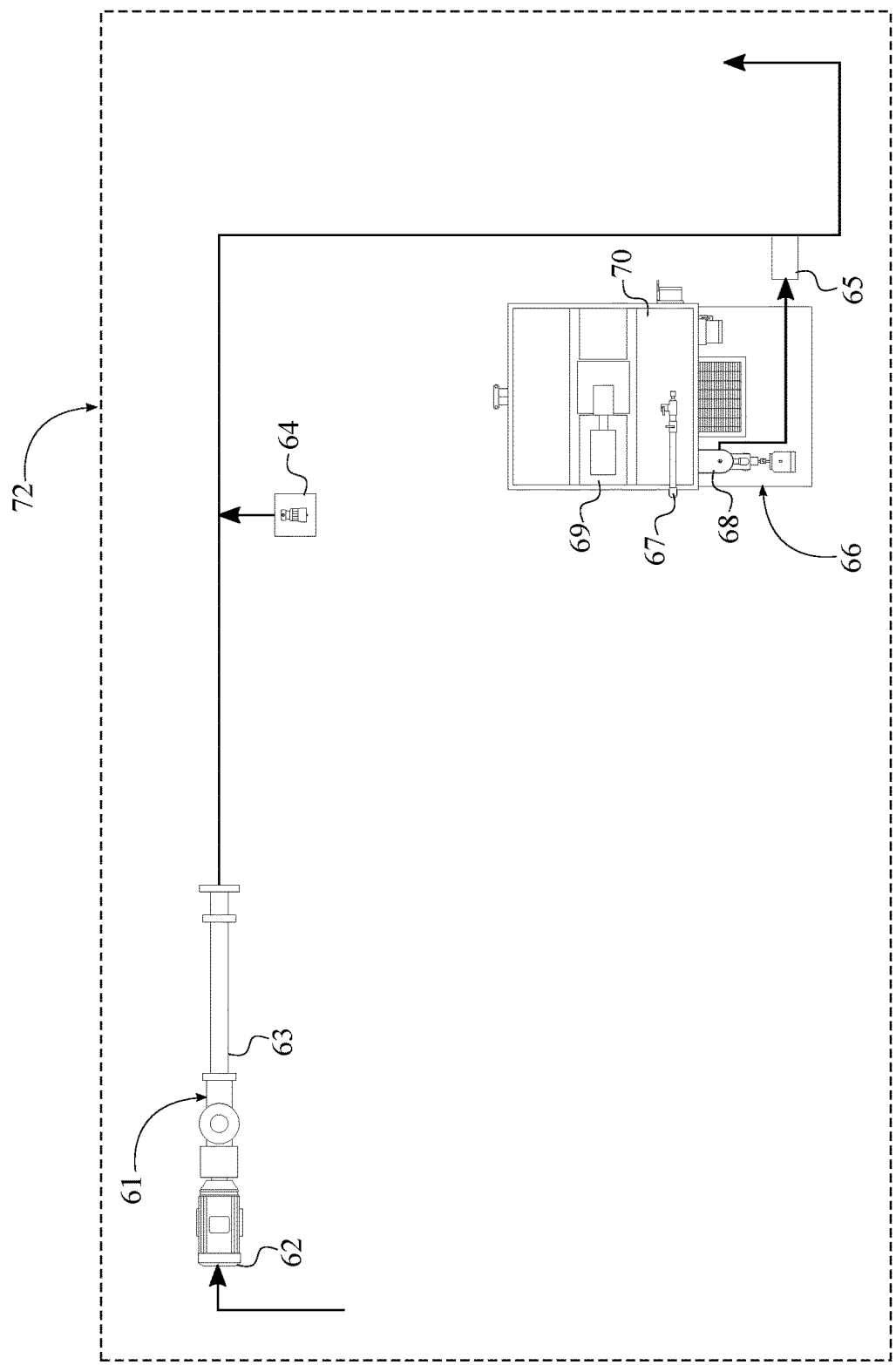
FIG. 2 is an illustration showing the in-fluid communication of the water clarifying assembly of the present invention.
Figure 3:
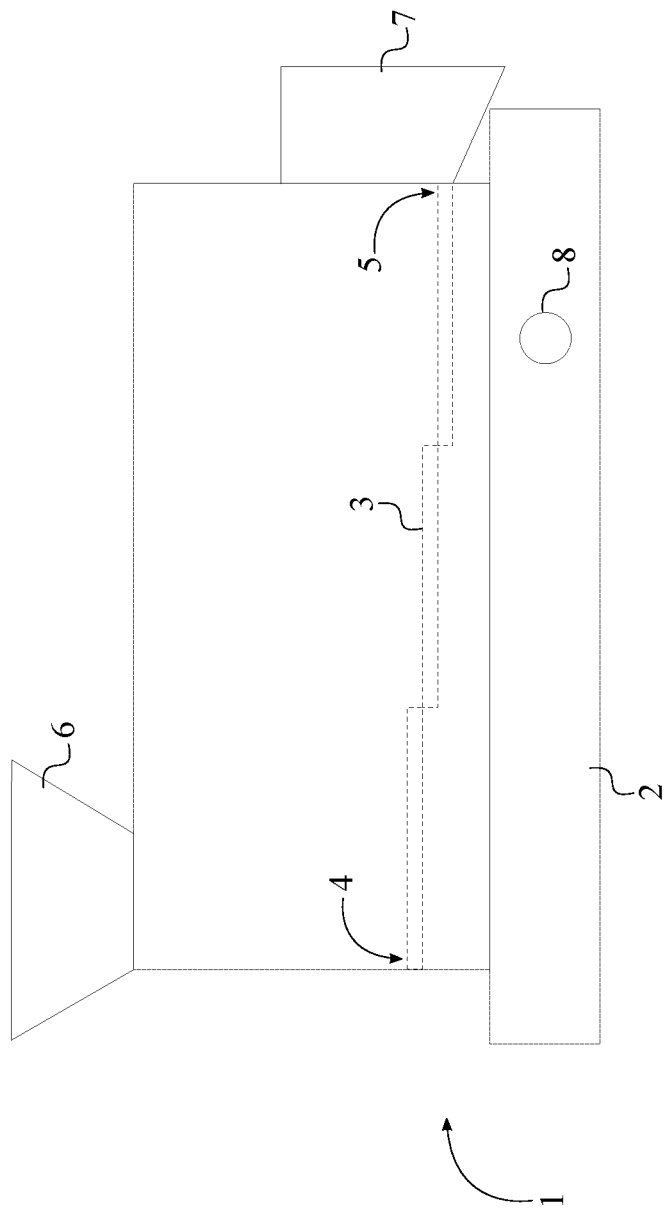
FIG. 3 is a basic illustration of the first linear-motion shale shaker of the present invention.

In reference to FIG. 1-2, the present invention comprises a first linear-motion shale shaker 1, a second linear-motion shale shaker 12, a submersible pump 9, a centrifugal pump 24, a first collection tank 20, a mud cleaner assembly 27, a variable frequency drive (VFD) centrifugal solid-liquid separator 55, and a water clarifying assembly 72. In reference to the general configuration of the present invention, the first linear-motion shale shaker 1 that accepts an initial load of solid and liquid waste is in fluid communication with the second linear-motion shale shaker 12 through the submersible pump 9. More specifically, the initial load of solid and liquid waste is separated into a first quantity of solid waste and a first flow of liquid waste by the first linear-motion shale shaker 1. The submersible pump 9 then discharges the first flow of liquid waste from the first linear-motion shale shaker 1 to the second linear-motion shale shaker 12 thus completing the fluid communication. Simultaneously, the first quantity of solid waste exits from the first linear-motion shale shaker 1. The second linear-motion screen shaker is in fluid communication with the centrifugal pump 24 through the first collection tank 20. In other words, the first flow of liquid waste is further separated into a second flow of liquid waste and a second quantity of solid waste by the second linear-motion shale shaker 12 thus allowing the second flow of liquid waste to be discharged into the first collection tank 20. Similar to the first quantity of solid waste, the second quantity of solid waste also exits from the second linear-motion shale shaker 12. The mud cleaner assembly 27, which receives the second flow of liquid waste, comprises a desander unit 28, a second collection tank 33, a pump 37, a desilter unit 38, a third collection tank 43, and a third linear-motion shale shaker 47. In reference to FIG. 1, the centrifugal pump 24 is in fluid communication with the second collection tank 33 through desander unit 28. The second collection tank 33 is in fluid communication with the desilter unit 38 through the pump 37. The desilter unit 38 is in fluid communication with the third collection tank 43. More specifically, the centrifugal pump 24 withdraws the second flow of liquid waste from the first collection tank 20 and discharges the second flow of liquid waste into the second collection tank 33 through the desander unit 28 that further separates the second flow of liquid waste into a third flow of liquid waste and a flow of semi de-sanded liquid. The pump 37 then withdraws the flow of semi de-sanded liquid from the second collection tank 33 and discharges the flow of semi de-sanded liquid into the third collection tank 43 through the desilter unit 38 that further separates the flow of semi de-sanded liquid into a fourth flow of liquid waste and a flow of de-sanded liquid. Simultaneously, the third flow of liquid waste and the fourth flow of liquid waste exit from the third linear-motion shale shaker 47. The third collection tank 43 is in fluid communication with the VFD centrifugal solid-liquid separator 55 through the water clarifying assembly 72 so that the flow of de-sanded liquid can be further process. More specifically, the VFD centrifugal solid-liquid separator 55 further process the flow of de-sanded liquid into a fifth flow of liquid waste and a flow of semi clean water by utilizing centrifugal force. The water clarifying system, which is in fluid communication in between the third collection tank 43 and the VFD centrifugal solid-liquid separator 55, adds coagulant and flocculant into the flow of de-sanded liquid in order to optimize the efficiency of the VFD centrifugal solid-liquid separator 55. Resultantly, the present invention is able to discharge the flow of semi clean water from the VFD centrifugal solid-liquid separator 55 by utilizing a discharge pump 71, wherein the semi clean water can be used as a usable flow of water.

The first linear-motion shale shaker 1 is a high frequency and vibrating solid processing device and functions as the first phase of solid control for the initial load of solid and liquid waste within the present invention. The present invention utilizes the first linear-motion shale shaker 1 to remove and collect large debris from the initial load of solid and liquid waste. In reference to FIG. 2, the first linear-motion shale shaker 1 comprises a first base compartment 2, a first screened particle separator 3, a waste hopper 6, a first solid particle outlet 7, and a first liquid waste outlet 8. The first screened particle separator 3 is mounted onto the first base compartment 2. The waste hopper 6 is mounted adjacent to an inlet end 4 of the first screened particle separator 3. The first solid particle outlet 7 is positioned adjacent to a lowered output end 5 of the first screened particle separator 3, opposite of the waste hopper 6. More specifically, the waste hopper 6 accepts the initial load of solid and liquid waste from waste trucks and then release them to the first screened particle separator 3 for processing. The first screened particle separator 3 then retains the first quantity of solid waste on top of screening filters of the first screened particle separator 3 thus allowing the first flow of liquid waste to drain into the first base compartment 2. Due to linear motion, vibrations, and the lowered output end, the first quantity of solid waste exits the present invention through the first solid particle outlet 7. The first liquid waste outlet 8 traverses into the first base compartment 2 and is in fluid communication with the waste hopper 6 through the first screened particle separator 3. Since the submersible pump 9 functions as the fluid transferring unit between the first linear-motion shale shaker 1 and the second linear-motion shale shaker 12, an inlet 10 of the submersible pump 9 is in fluid communication with the first liquid waste outlet 8. Resultantly, the first flow of liquid waste that is collected within the first base compartment 2 can be discharged into the inlet 10 of the submersible pump 9 through the first liquid waste outlet 8.

Figure 4:
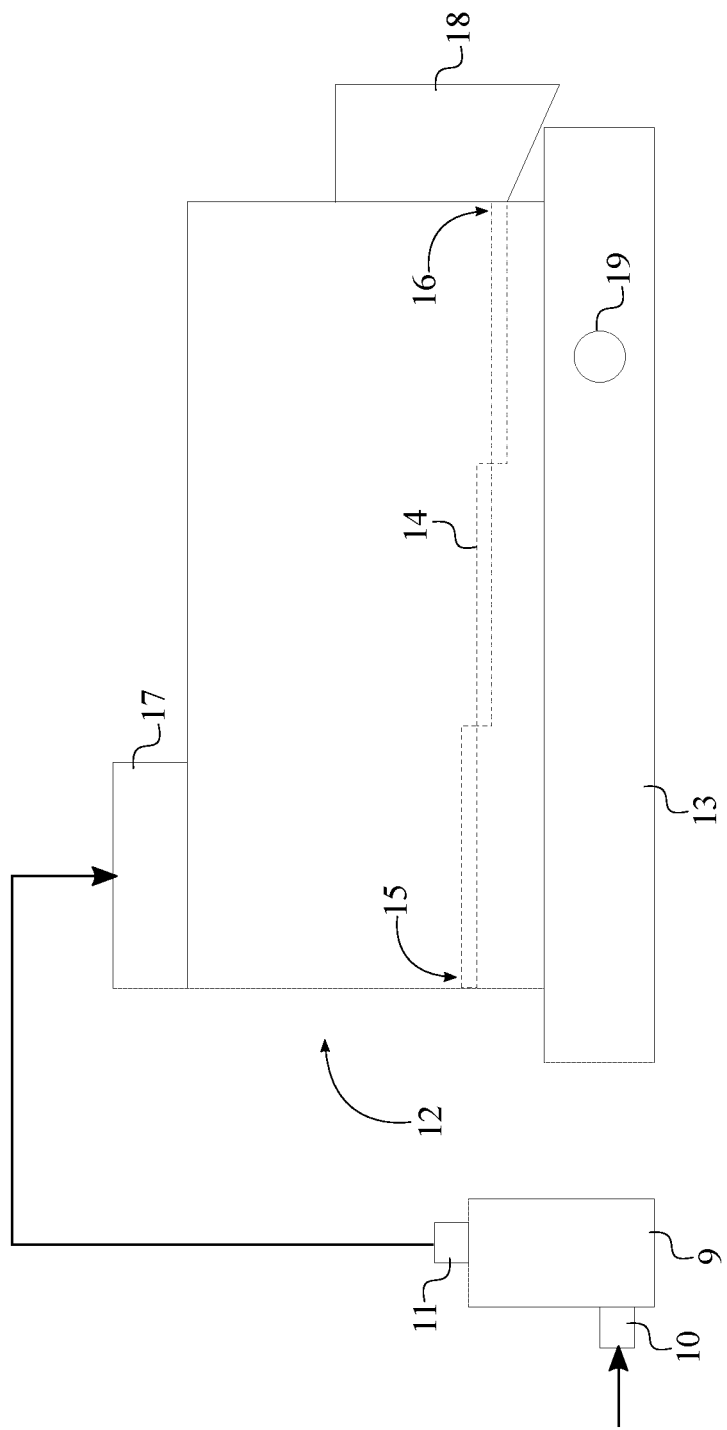
FIG. 4 is an illustration showing the second linear-motion shale shaker and the submersible pump of the present invention.

The second linear-motion shale shaker 12 is also a high frequency and vibrating solid processing device and functions as the second phase of solid control for the first flow of liquid waste within the present invention. The present invention utilizes the second linear-motion shale shaker 12 to remove and collect large sand particle from the first flow of liquid waste. In reference to FIG. 4, the second linear-motion shale shaker 12 comprises a second base compartment 13, a second screened particle separator 14, a first feeder inlet 17, a second solid particle outlet 18, and a second liquid waste outlet 19. The second screened particle separator 14 is mounted onto the second base compartment 13. The first feeder inlet 17 is mounted adjacent to an inlet end 15 of the second screened particle separator 14. The second solid particle outlet 18 is positioned adjacent to a lowered output end 16 of the second screened particle separator 14, opposite of the first feeder inlet 17. More specifically, the first feeder inlet 17 accepts the first flow of liquid waste from the first linear-motion shale shaker 1. Since the submersible pump 9 functions as the fluid transferring unit between the first linear-motion shale shaker 1 and the second linear-motion shale shaker 12, an outlet 11 of the submersible pump 9 is in fluid communication with the first feeder inlet 17 so that the first flow of liquid waste can be released to the second screened particle separator 14 for further processing. The second screened particle separator 14 then retains the second quantity of solid waste on top of screening filters of the second screened particle separator 14 thus allowing the second flow of liquid waste to drain into the second base compartment 13. Due to linear motion, vibrations, and the lowered output end, the second quantity of solid waste exits the present invention through the second solid particle outlet 18. The second liquid waste outlet 19 traverses into the second base compartment 13 and is in fluid communication with the first feeder inlet 17 through the second screened particle separator 14. Resultantly, the second flow of liquid waste that is collected within the second base compartment 13 can be discharged into the first collection tank 20 through the second liquid waste outlet 19.

Figure 5:
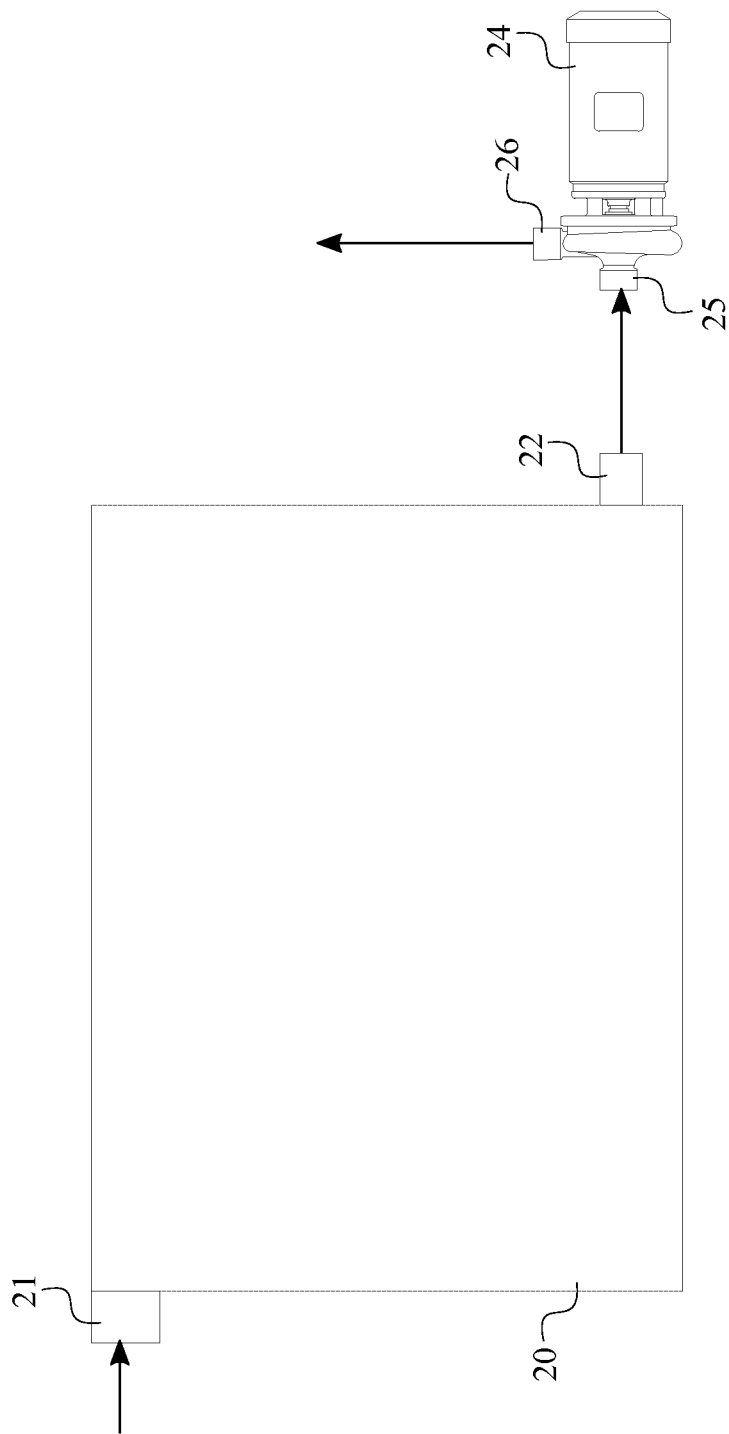
FIG. 5 is an illustration showing the first collection tank and the centrifugal pump of the present invention.

The first collection tank 20 provides storage space for the second flow of liquid waste so that the centrifugal pump 24 can discharge the second flow of liquid waste into the desander unit 28. Capacity of the first collection tank 20 is determined upon the initial load of solid and liquid waste so that the present invention is able to continuously operate under optimal efficiency. In reference to FIG. 5, the second liquid waste outlet 19 is in fluid communication with a first tank inlet 21 of the first collection tank 20, and a first tank outlet 22 of the first collection tank 20 is in fluid communication with an inlet 25 of the centrifugal pump 24 thus completing the in-fluid communication between the first collection tank 20 and the centrifugal pump 24. Resultantly, the centrifugal pump 24 is able to withdraw and discharge the second flow of liquid waste into the third phase of solid control. Furthermore, a first agitator 23 is mounted within the first collection tank 20 as shown in FIG. 1 to maintain the viscosity of the second flow of liquid waste which in turn improves the reliability of the centrifugal pump 24.

Figure 6:
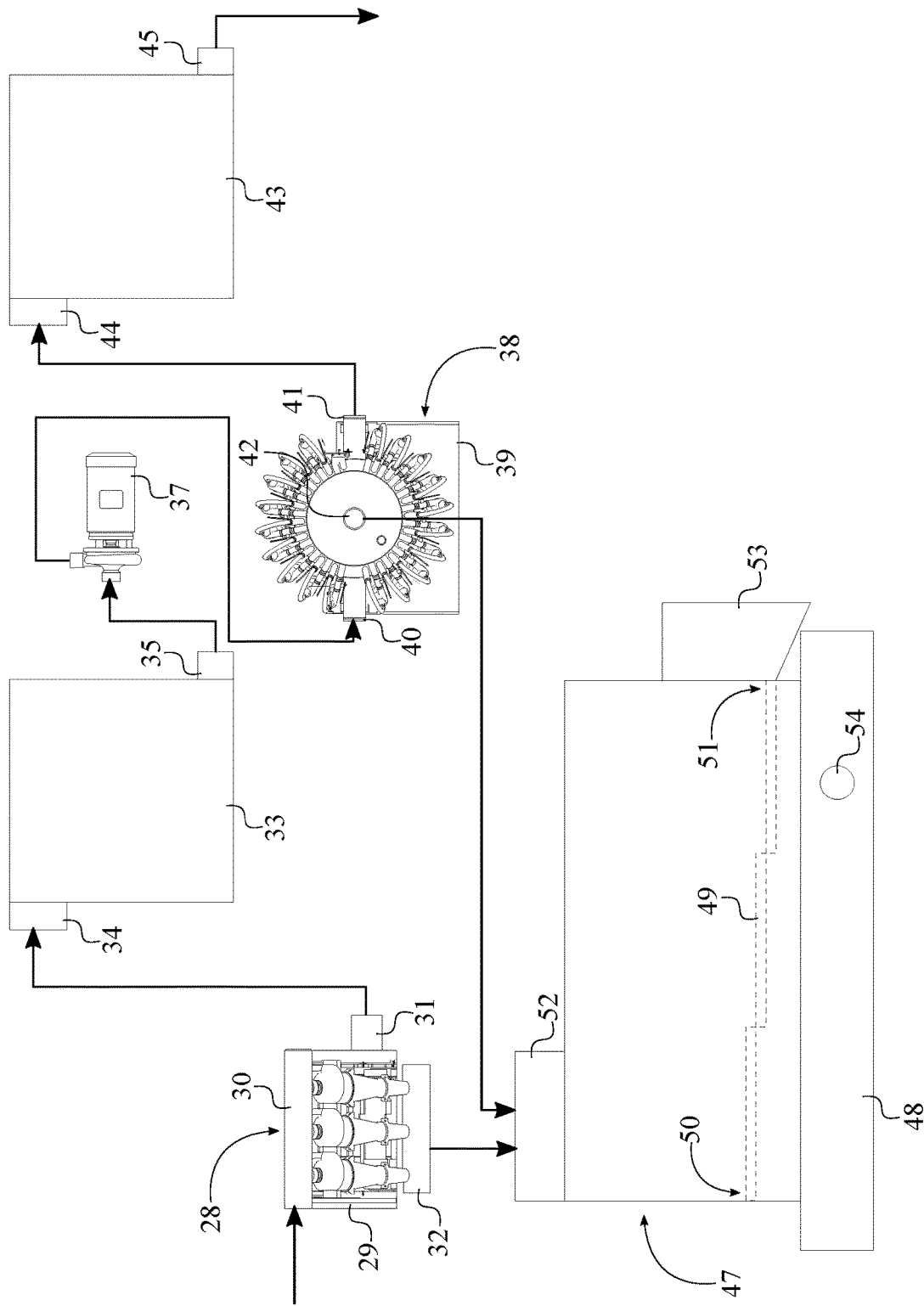
FIG. 6 is an illustration showing the mud cleaner assembly of the present invention.

In reference to FIG. 1 and FIG. 6, the mud cleaner assembly 27 implements the third phase of solid control within the present invention. Within the third phase of solid control, the mud cleaner assembly 27 is separates medium cut point media from the second flow of liquid waste. These medium cut point media are deposited to a very fine mesh screen of the third linear-motion shale shaker 47 through the desilter unit 38 and the desander unit 28 so that all remaining fine sand and a large portion of the silt phase can be removed. These removed materials can go to landfill or can be used for underlayment of construction sites or road building. The flow of semi de-sanded liquid and the flow of de-sanded liquid that are respectively produced by the desander unit 28 and the desilter unit 38 is discharged into the second collection tank 33 and the third collection tank 43 for further processing.

The desander unit 28 comprises a desander body 29, a desander inlet 30, a desander clean fluid outlet 31, and a desander waste fluid outlet 32 as shown in FIG. 6. The desander inlet 30 is in fluid communication with the desander clean fluid outlet 31 and the desander waste fluid outlet 32 through the desander body 29 so that the desander unit 28 capable of processing the second flow of liquid waste into the third flow of liquid waste and the flow of semi de-sanded liquid. More specifically, the outlet 26 of the centrifugal pump 24 is in fluid communication with the desander inlet 30 in order to supply the second flow of liquid waste. The desander unit 28 is then able to initiate the third phase of solid control of the mud cleaner assembly 27 thus separating large slit-sized (40-100 microns) solids from the second flow of liquid waste. Removed large slit-sized solids are then released onto the third linear-motion shale shaker 47 through the desander waste fluid outlet 32 that is positioned atop a second feeder inlet 52 of the third linear-motion shale shaker 47 as the third flow of liquid waste. The flow of semi de-sanded liquid is then discharged into the second collection tank 33 for further processing as the desander clean fluid outlet 31 is in fluid communication with a second tank inlet 34 of the second collection tank 33.

In reference to FIG. 6, the second collection tank 33 provides storage space for the flow of semi de-sanded liquid so that the pump 37 can discharge the flow of semi de-sanded liquid into the desilter unit 38. Capacity of the second collection tank 33 is determined upon the output volume of the flow of semi de-sanded liquid so that the present invention is able to continuously operate under optimal efficiency. Furthermore, a second agitator 36 is mounted within the second collection tank 33 as shown in FIG. 1 to maintain the viscosity of the flow of semi de-sanded liquid which in turn improves the reliability of the pump 37.

The desilter unit 38 comprises a desilter body 39, a desilter clean fluid outlet 41, and a desilter waste fluid outlet 42 in addition to the desilter inlet 40 as shown in FIG. 6. The desilter inlet 40 is in fluid communication with the desilter clean fluid outlet 41 and the desilter waste fluid outlet 42 through the desilter body 39 so that the desilter unit 38 capable of processing flow of semi de-sanded liquid into the fourth flow of liquid waste and the flow of de-sanded liquid. More specifically, a second tank outlet 35 of the second collection tank 33 is in fluid communication with the desilter fluid inlet through the pump 37. As a result, the flow of semi de-sanded liquid can be supplied the desilter unit 38 to complete the third phase of solid control of the mud cleaner assembly 27 so that the desilter unit 38 is able to separate fine slit-sized (20-74 microns) solids from the flow of semi de-sanded liquid. Removed fine slit-sized solids are then released onto the third linear-motion shale shaker 47 through the desilter waste fluid outlet 42 that is positioned atop the second feeder inlet 52 of the third linear-motion shale shaker 47 as the fourth flow of liquid waste. The flow of de-sanded liquid is then discharged into the third collection tank 43 for further processing as the desilter clean fluid outlet 41 is in fluid communication with a third tank inlet 44 of the third collection tank 43.

In reference to FIG. 6, the third collection tank 43 provides storage space for the flow of de-sanded liquid so that a stator pump 61 of the water clarifying assembly 72 can discharge the flow of de-sanded liquid into the VFD centrifugal solid-liquid separator 55. Capacity of the third collection tank 43 is determined upon the output volume of the flow of de-sanded liquid so that the present invention is able to continuously operate under optimal efficiency. Furthermore, a third agitator 46 is mounted within the third collection tank 43 as shown in FIG. 1 to maintain the viscosity of the flow of de-sanded liquid which in turn improves the reliability of the stator pump 61.

The third linear-motion shale shaker 47 is also a high frequency and vibrating solid processing device and functions as a final stage of third phase of solid control within the present invention. The present invention utilizes the third linear-motion shale shaker 47 to remove and collect large slit-sized solids from the third flow of liquid waste and fine slit-sized solids from the fourth flow of liquid waste. In reference to FIG. 6, the third linear-motion shale shaker 47 comprises a third base compartment 48, a third screened particle separator 49, a third solid particle outlet 53, a third liquid waste outlet 54, and the second feeder inlet 52. The third screened particle separator 49 is mounted onto the third base compartment 48. The second feeder inlet 52 is mounted adjacent to an inlet end 50 of the third screened particle separator 49. The third solid particle outlet 53 is positioned adjacent to a lowered output end 51 of the third screened particle separator 49, opposite of the second feeder inlet 52. More specifically, the second feeder inlet 52 receives the third flow of liquid waste and the fourth flow of liquid waste from the desander unit 28 and the desilter unit 38, respectively. The third screened particle separator 49 then retains solid waste material on top of screening filters of the third screened particle separator 49 in order to discharge them through the third solid particle outlet 53. Optionally, a third flow of liquid waste that is drained from the third flow of liquid waste and the fourth flow of liquid waste through the screening filters can be discharged into the second collection in order to recycle the third flow of liquid waste back into the present invention.

The water clarifying assembly 72 prepare the third flow of liquid waste within the present invention so that the VFD centrifugal solid-liquid separator 55 is efficiently outs the usable flow of water. In reference to FIG. 2, the water clarifying assembly 72 comprises a chemical injection unit 64, a polymer injection unit 65, a polymer make down unit 66, and the stator pump 61. The flow of de-sanded liquid is withdrawn and propelled through the water clarifying assembly 72 by the stator pump 61 due to the fact that the third collection tank 43 is in fluid communication with the stator pump 61, and the stator pump 61 is in fluid communication with the polymer injection unit 65 through the chemical injection unit 64. More specifically, an inlet 62 of the stator pump 61 is in fluid communication with a third tank outlet 45 of the third collection tank 43. An outlet 63 of the stator pump 61 is in fluid communication with the chemical injection point. The chemical injection unit 64 is in fluid communication with the polymer injection unit 65. Resultantly, the stator pump 61 is able to push the flow of de-sanded liquid into the polymer injection unit 65 through the chemical injection unit 64.

In reference to FIG. 2, the chemical injection unit 64 supplies a flow of coagulant to the flow of de-sanded liquid within the present invention. A coagulant is an inorganic or organic substance that initiates or aids a congealing process during water treatment. The flow of coagulant is added into the flow of de-sanded liquid to aggregate dissolved contaminants and tiny particles into larger particles so that filtration, clarification, or any other solid removal process may be used to remove them. The polymer make down unit 66 is in fluid communication with the polymer injection unit 65 so that a flow of flocculants can be added to the flow of de-sanded liquid. Flocculants functions similar to the coagulant and bind microscopic particle together to form larger particle further purifying the flow of de-sanded liquid. In reference to FIG. 1-2, the polymer make down unit 66 is in fluid communication with the polymer injection unit 65 so that the polymer make down unit 66 can supply the flow of flocculants to the polymer injection unit 65.

The polymer make down unit 66 mixes water and flocculants so that the flow of flocculants can be formed within the present invention. In reference to FIG. 2, the polymer make down unit 66 comprises a water inlet 67, a polymer outlet 68, a polymer storage compartment 69, and a mixing compartment 70. The polymer storage compartment 69 that stores flocculants is in fluid communication with the mixing compartment 70 thus allowing the flocculants to be drained into the mixing compartment 70. The water inlet 67 and the polymer outlet 68 traverses into the mixing compartment 70 as the water inlet 67 provide a supply of water flow to properly mix the flocculants within the mixing compartment 70. The flow of flocculants that is supplied to the flow of de-sanded liquid is discharged through the polymer outlet 68 as the mixing compartment 70 is in fluid communication with the polymer injection unit 65 through the polymer outlet 68.

Figure 7:
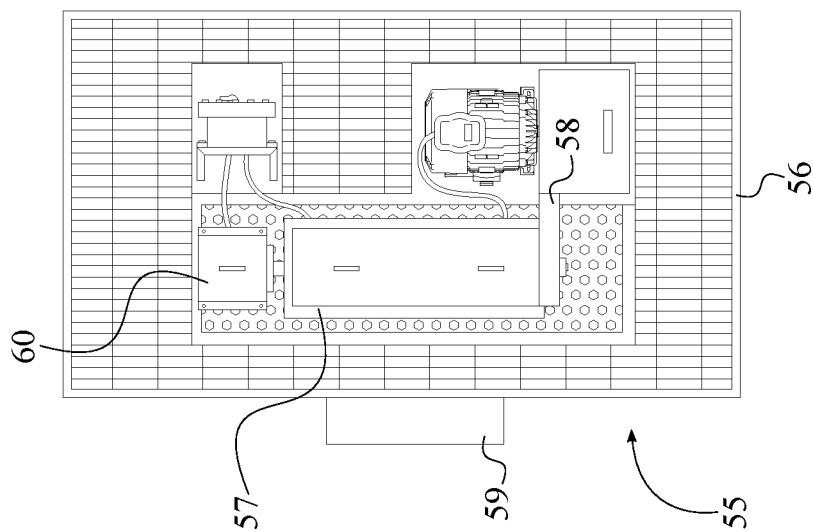
FIG. 7 is an illustration showing the Variable Frequency Drive (VFD) Centrifugal solid-liquid separator of the present invention.

The polymer injection unit 65 which combines the flow of flocculants into the flow of de-sanded liquid is in fluid communication with the VFD centrifugal solid-liquid separator 55 so that the fourth phase of solid control can be initiated within the present invention. In reference to FIG. 7, the VFD centrifugal solid-liquid separator 55 comprises a structural frame 56, a centrifugal separator 57, a separator inlet 58, a separator solid particle outlet 59, and a separator liquid outlet 60. The centrifugal separator 57 utilizes centrifugal force and further processes the flow of de-sanded liquid into the fifth flow of liquid waste and the flow of semi-clean water. The centrifugal separator 57 is mounted to the structural frame 56 thus completing the main body of the VFD centrifugal solid-liquid separator 55. The separator inlet 58 that supplies the flow of de-sanded liquid is in fluid communication with the separator solid particle outlet 59 and the separator liquid outlet 60 through the centrifugal separator 57. In other words, the flow of de-sanded liquid from the polymer injection unit 65 is supplied to the centrifugal separator 57 as the separator inlet 58 is in fluid communication with the polymer injection unit 65. The flow of semi-clean water is then released into the separator liquid outlet 60 and propelled out of the present invention through a discharged pump 37 that is in fluid communication with the separator liquid outlet 60. Furthermore, the VFD centrifugal solid-liquid separator 55 also discharges the fifth flow of liquid waste through the separator solid particle outlet 59.

Although the invention has been explained in relation to its preferred embodiment, it is to be understood that many other possible modifications and variations can be made without departing from the spirit and scope of the invention as hereinafter claimed.

What is claimed is:

1. A system for processing solid and liquid waste collected from various construction sites comprises:
    a first linear-motion shale shaker;
    a second linear-motion shale shaker;
    a submersible pump;
    a centrifugal pump;
    a first collection tank;
    a mud cleaner assembly;
    a variable frequency drive (VFD) centrifugal solid-liquid separator;
    a water clarifying assembly;
    the mud cleaner assembly comprises a desander unit, a second collection tank, a pump, a desilter unit, a third collection tank, and a third linear-motion shale shaker;
    the first linear-motion shale shaker being in fluid communication with the second linear-motion shale shaker through the submersible pump;
    the second linear-motion shale shaker being in fluid communication with the centrifugal pump through the first collection tank;
    the centrifugal pump being in fluid communication with the second collection tank through the desander unit;
    the second collection tank being in fluid communication with the desilter unit through the pump;
    the desilter unit being in fluid communication with the third collection tank;
    the third collection tank being in fluid communication with the VFD centrifugal solid-liquid separator through the water clarifying assembly;
    a first agitator;
    the first agitator being mounted within the first collection tank;
    a second liquid waste outlet of the second linear-motion shale shaker being in fluid communication with a first tank inlet of the first collection tank; and
    an inlet of the centrifugal pump being in fluid communication with a first tank outlet of the first collection tank.

2. The system for processing solid and liquid waste collected from various construction sites as claimed in claim 1 comprises:
    the first linear-motion shale shaker comprises a first base compartment, a first screened particle separator, a waste hopper, a first solid particle outlet, and a first liquid waste outlet;
    the first screened particle separator being mounted onto the first base compartment;
    the waste hopper being mounted adjacent to an inlet end of the first screened particle separator;
    the first solid particle outlet being positioned adjacent to a lowered output end of the first screened particle separator, opposite of the waste hopper;
    the first liquid waste outlet traverses into the first base compartment; and
    the waste hopper being in fluid communication with the first liquid waste outlet through the first screened particle separator.

3. The system for processing solid and liquid waste collected from various construction sites as claimed in claim 1 comprises:
    the second linear-motion shale shaker comprises a second base compartment, a second screened particle separator, a first feeder inlet, a second solid particle outlet, and a second liquid waste outlet;
    the second screened particle separator being mounted onto the second base compartment;
    the first feeder inlet being mounted adjacent to an inlet end of the second screened particle separator;
    the second solid particle outlet being positioned adjacent to a lowered output end of the second screened particle separator, opposite of the first feeder inlet;
    the second liquid waste outlet traverses into the second base compartment; and the first feeder inlet being in fluid communication with the second liquid waste outlet through the second screened particle separator.

4. The system for processing solid and liquid waste collected from various construction sites as claimed in claim 1 comprises:
   an inlet of the submersible pump being in fluid communication with a first liquid waste outlet of the first linear-motion shale shaker; and
   an outlet of the submersible pump being in fluid communication with a first feeder inlet of the second linear-motion shale shaker.

5. The system for processing solid and liquid waste collected from various construction sites as claimed in claim 1 comprises:
   the desander unit comprises a desander body, a desander inlet, a desander clean fluid outlet, and a desander waste fluid outlet;
   the desander inlet being in fluid communication with the desander clean fluid outlet and the desander waste fluid outlet through the desander body;
   an outlet of the centrifugal pump being in fluid communication with the desander inlet;
   the desander clean fluid outlet being in fluid communication with a second tank inlet of the second collection tank; and
   the desander waste fluid outlet being in fluid communication with a second feeder inlet of the third linear-motion shale shaker.

6. The system for processing solid and liquid waste collected from various construction sites as claimed in claim 1 comprises:
   the desilter unit comprises a desilter body, a desilter inlet, a desilter clean fluid outlet, and a desilter waste fluid outlet;
   the desilter inlet being in fluid communication with the desilter clean fluid outlet and the desilter waste fluid outlet through the desilter body;
   a second tank outlet of the second collection tank being in fluid communication with the desilter inlet through the pump;
   the desilter clean fluid outlet being in fluid communication with a third tank inlet of the third collection tank; and
   the desilter waste fluid outlet being in fluid communication with a second feeder inlet of the third linear-motion shale shaker.

7. The system for processing solid and liquid waste collected from various construction sites as claimed in claim 1 comprises:
   the third linear-motion shale shaker comprises a third base compartment, a third screened particle separator, a second feeder inlet, a third solid particle outlet, and a third liquid waste outlet;
   the third screened particle separator being mounted onto the third base compartment;
   the second feeder inlet being mounted adjacent to an inlet end of the third screened particle separator;
   the third solid particle outlet being positioned adjacent to a lowered output end of the third screened particle separator, opposite of the second feeder inlet;
   the third liquid waste outlet traverses into the third base compartment; and
   the second feeder inlet being in fluid communication with the third liquid waste outlet through the third screened particle separator.

8. A system for processing solid and liquid waste collected from various construction sites comprises:
   a first linear-motion shale shaker;
   a second linear-motion shale shaker;
   a submersible pump,
   a centrifugal pump,
   a first collection tank,
   a mud cleaner assembly,
   a variable frequency drive (VFD) centrifugal solid-liquid separator,
   a water clarifying assembly,
   the mud cleaner assembly comprises a desander unit, a second collection tank, a pump, a desilter unit, a third collection tank, and a third linear-motion shale shaker;
   the first linear-motion shale shaker being in fluid communication with the second linear-motion shale shaker through the submersible pump;
   the second linear-motion shale shaker being in fluid communication with the centrifugal pump through the first collection tank;
   the centrifugal pump being in fluid communication with the second collection tank through the desander unit;
   the second collection tank being in fluid communication with the desilter unit through the pump;
   the desilter unit being in fluid communication with the third collection tank;
   the third collection tank being in fluid communication with the VFD centrifugal solid-liquid separator through the water clarifying assembly;
   a second agitator; and
   the second agitator being mounted within the second collection tank.

9. A system for processing solid and liquid waste collected from various construction sites comprises:
   a first linear-motion shale shaker;
   a second linear-motion shale shaker;
   a submersible pump;
   a centrifugal pump;
   a first collection tank;
   a mud cleaner assembly;
   a variable frequency drive (VFD) centrifugal solid-liquid separator;
   a water clarifying assembly;
   the mud cleaner assembly comprises a desander unit, a second collection tank, a pump, a desilter unit, a third collection tank, and a third linear-motion shale shaker;
   the first linear-motion shale shaker being in fluid communication with the second linear-motion shale shaker through the submersible pump;
   the second linear-motion shale shaker being in fluid communication with the centrifugal pump through the first collection tank;
   the centrifugal pump being in fluid communication with the second collection tank through the desander unit;
   the second collection tank being in fluid communication with the desilter unit through the pump;
   the desilter unit being in fluid communication with the third collection tank;
   the third collection tank being in fluid communication with the VFD centrifugal solid-liquid separator through the water clarifying assembly;
   a third agitator; and
   the third agitator being mounted within the third collection tank.

10. A system for processing solid and liquid waste collected from various construction sites comprises:
    a first linear-motion shale shaker;

a second linear-motion shale shaker;
a submersible pump;
a centrifugal pump;
a first collection tank;
a mud cleaner assembly;
a variable frequency drive (VFD) centrifugal solid-liquid separator;
a water clarifying assembly;
the mud cleaner assembly comprises a desander unit, a second collection tank, a pump, a desilter unit, a third collection tank, and a third linear-motion shale shaker;
the first linear-motion shale shaker being in fluid communication with the second linear-motion shale shaker through the submersible pump;
the second linear-motion shale shaker being in fluid communication with the centrifugal pump through the first collection tank;
the centrifugal pump being in fluid communication with the second collection tank through the desander unit;
the second collection tank being in fluid communication with the desilter unit through the pump;
the desilter unit being in fluid communication with the third collection tank;
the third collection tank being in fluid communication with the VFD centrifugal solid-liquid separator through the water clarifying assembly;
the water clarifying assembly comprises a stator pump, a chemical injection unit, a polymer injection unit, and a polymer make down unit;
the third collection tank being in fluid communication with the stator pump;
the stator pump being in fluid communication with the polymer injection unit through the chemical injection unit;
the polymer make down unit being in fluid communication with the polymer injection unit; and
the polymer injection unit being in fluid communication with the VFD centrifugal solid-liquid separator.

11. The system for processing solid and liquid waste collected from various construction sites as claimed in claim 10 comprises:
an inlet of the stator pump being in fluid communication with a third tank outlet of the third collection tank;
an outlet of the stator pump being in fluid communication the chemical injection unit; and
the chemical injection point unit being in fluid communication with the polymer injection unit.

12. The system for processing solid and liquid waste collected from various construction sites as claimed in claim 10 comprises:
the polymer make down unit comprises a water inlet, a polymer outlet, a polymer storage compartment, and a mixing compartment;
the polymer storage compartment being in fluid communication with the mixing compartment;
the water inlet and the polymer outlet traverses into the mixing compartment; and
the mixing compartment being in fluid communication with the polymer injection unit through the polymer outlet.

13. The system for processing solid and liquid waste collected from various construction sites as claimed in claim 10 comprises:
a discharge pump;
the VFD centrifugal solid-liquid separator comprises a structural frame, a centrifugal separator, a separator inlet, a separator solid particle outlet, and a separator liquid outlet;
the centrifugal separator being mounted to the structural frame;
the separator inlet being in fluid communication with the separator solid particle outlet and the separator liquid outlet through the centrifugal separator;
the separator inlet being in fluid communication with the polymer injection unit; and
the separator liquid outlet being in fluid communication with the discharge pump.

14. The system for processing solid and liquid waste collected from various construction sites as claimed in claim 10 comprises:
a first agitator;
the first agitator being mounted within the first collection tank.

15. The system for processing solid and liquid waste collected from various construction sites as claimed in claim 10 comprises:
a second agitator;
the second agitator being mounted within the second collection tank.

16. The system for processing solid and liquid waste collected from various construction sites as claimed in claim 10 comprises:
a third agitator;
the third agitator being mounted within the third collection tank.

17. The system for processing solid and liquid waste collected from various construction sites as claimed in claim 10 comprises at least one of:
a first agitator mounted within the first collection tank;
a second agitator mounted within the second collection tank; and
a third agitator mounted within the third collection tank.

* * * * *